(12) United States Patent
Thereska et al.

(10) Patent No.: US 9,723,028 B2
(45) Date of Patent: Aug. 1, 2017

(54) DISTRIBUTED FILE SYSTEM

(71) Applicant: Microsoft Technology Licensing, LLC, Redmond, WA (US)

(72) Inventors: Eno Thereska, Cambridge (GB); Dinan Srilal Gunawardena, Cambridge (GB); James W. Scott, Cambridge (GB); Richard Harper, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/193,371

(22) Filed: Jun. 27, 2016

(65) Prior Publication Data

US 2016/0308913 A1 Oct. 20, 2016

Related U.S. Application Data

(62) Division of application No. 13/077,198, filed on Mar. 31, 2011, now Pat. No. 9,384,199.

(51) Int. Cl.
*G06F 1/00* (2006.01)
*H04L 29/06* (2006.01)
*G06F 17/30* (2006.01)
*G06F 1/32* (2006.01)

(52) U.S. Cl.
CPC .......... *H04L 63/205* (2013.01); *G06F 1/3203* (2013.01); *G06F 17/30041* (2013.01); *G06F 17/30091* (2013.01); *G06F 17/30194* (2013.01); *G06F 17/30569* (2013.01)

(58) Field of Classification Search
CPC .................................................. G06F 1/3203
See application file for complete search history.

(56) References Cited

U.S. PATENT DOCUMENTS

| | | |
|---|---|---|
| 5,469,553 A | 11/1995 | Patrick |
| 6,925,529 B2 | 8/2005 | Bohrer et al. |
| 7,032,119 B2 | 4/2006 | Fung |
| 7,035,972 B2 | 4/2006 | Guha et al. |
| 7,043,650 B2 | 5/2006 | Bresniker et al. |
| 7,092,943 B2 | 8/2006 | Roese et al. |
| 7,093,149 B2 | 8/2006 | Tsirkel et al. |

(Continued)

OTHER PUBLICATIONS

Fisher, et al., "Tempe: An Interactive Data Science Environment for Exploration of Temporal and Streaming Data", In Technical Report, Nov., 2014, 7 Pages.

(Continued)

*Primary Examiner* — Ajith Jacob

(57) ABSTRACT

A distributed file system for devices is described. In an embodiment, each data element stored on one of the devices has an associated location and availability attribute. The location attribute is stored co-located with the data element. The availability attribute and a copy of the location attribute are stored by a metadata service. When a client on a device needs to access a data element, it sends a request to the metadata service to find the location of the data element. If the data element is available, this information is provided to the client and this may involve waking a dormant device which holds the data element. Where the data element is not available, read only access may be granted to a cached copy of the data element. Where replication is used and one of the devices holding a replica is unavailable, the system may use write off-loading.

18 Claims, 9 Drawing Sheets

(56) References Cited

U.S. PATENT DOCUMENTS

| | | |
|---|---|---|
| 7,600,137 B2 | 10/2009 | Trappeniers et al. |
| 7,673,161 B2 | 3/2010 | Freeman et al. |
| 2002/0167952 A1 | 11/2002 | Watson et al. |
| 2002/0177449 A1 | 11/2002 | McDonnell et al. |
| 2003/0217299 A1 | 11/2003 | Neuman et al. |
| 2004/0107273 A1 | 6/2004 | Biran et al. |
| 2004/0230848 A1 | 11/2004 | Mayo et al. |
| 2005/0044436 A1 | 2/2005 | Holle |
| 2005/0204027 A1 | 9/2005 | Claseman |
| 2006/0171329 A1 | 8/2006 | Ying |
| 2006/0251115 A1 | 11/2006 | Haque et al. |
| 2007/0006174 A1 | 1/2007 | Sohm et al. |
| 2007/0011472 A1 | 1/2007 | Cheng |
| 2007/0022121 A1 | 1/2007 | Bahar et al. |

OTHER PUBLICATIONS

Santos, et al., "DiAl: Distributed Streaming Analytics Anywhere, Anytime", In Proceedings of the VLDB Endowment, vol. 6, No. 12, Aug. 26, 2013, pp. 1386-1389.

Chaiken, et al., "SCOPE: Easy and Efficient Parallel Processing of Massive Data Sets", In Proceedings of the VLDB Endowment, vol. 1, No. 2, Aug., 2008, 12 pages.

Chandramouli, et al., "Trill: A High-Performance Incremental Query Processor for Diverse Analytics", In Proceedings of the VLDB Endowment, vol. 8, No. 4, Dec., 2014, 12 pages.

Chandramouli, et al., "The Trill Incremental Analytics Engine", In Technical Report, Apr., 2014, 14 pages.

"DocumentDB", Published on: Mar. 7, 2015 Available at: http://azure.microsoft.com/en-us/services/documentdb/.

DISTRIBUTED FILE SYSTEM

RELATED APPLICATIONS

This divisional application claims priority to U.S. application Ser. No. 13/077,198, filed on Mar. 31, 2011, and entitled "DISTRIBUTED FILE SYSTEM." This application claims the benefit of the above-identified application, and the disclosure of the above-identified application is hereby incorporated by reference in its entirety as if set forth herein in full.

BACKGROUND

With the increase in popularity and availability of smart phones, tablet computers, media players and other computing devices, users typically have more than one computing device where they store data. Although many of these devices may be able to be connected to a network, such as a home network or cellular telecommunications network, accessing files from one device (e.g. a laptop computer) which were created on another device (e.g. a desktop computer) generally requires pre-planning on behalf the user. Portable memory devices, such as USB sticks, are commonly used to transfer files between devices.

The embodiments described below are not limited to implementations which solve any or all of the disadvantages of known data access/sharing solutions.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

A distributed file system for devices is described. In an embodiment, each data element stored on one of the devices has an associated location and availability attribute. The location attribute is stored co-located with the data element. The availability attribute and a copy of the location attribute are stored by a metadata service. When a client on a device needs to access a data element, it sends a request to the metadata service to find the location of the data element. If the data element is available, this information is provided to the client and this may involve waking a dormant device which holds the data element. Where the data element is not available, read only access may be granted to a cached copy of the data element. Where replication is used and one of the devices holding a replica is unavailable, the system may use write off-loading.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Data storage systems comprising multiple computing devices have been developed for enterprise applications; however the requirements of personal storage systems tend to be very different to their enterprise counterparts. Such storage systems are often not designed for non-experts and can create difficulty, frustration and confusion for users at home. Enterprise storage systems, which may be designed for data centers, have performance, consistency, reliability and data persistence as their main metric (irrespective of the cost and systems redundancy implications that ensue) and such systems typically comprise multiple identical (or very similar) servers densely connected by high speed data connections.

In the home environment, the situation is different for a number of reasons. First, the "servers" which provide the data storage can include desktop and laptop computers, digital cameras, smart phones, music players, digital photo frames and games consoles (e.g. consumer or personal devices). Consequently the amount of onboard storage and other characteristics of the devices can vary considerably and at any time some of the devices may be switched off or otherwise unavailable. Additionally, the data connections between devices may not be high speed and may be sparse. For example, worldwide residential broadband penetration is only expected to reach 34% by 2013 and approximately half of households with broadband have no home network linking multiple devices. Furthermore, as many of the home user's devices are portable, the quality of links between devices may change, e.g. a user's smart phone and desktop computer may be connected by a wireless home network when the user is at home, but when the user leaves the home, any connection between the devices may rely on the quality of the cellular telephone network and that may change as the user moves around (e.g. between 2G 2.5G and 3G network coverage).

Figure 1:
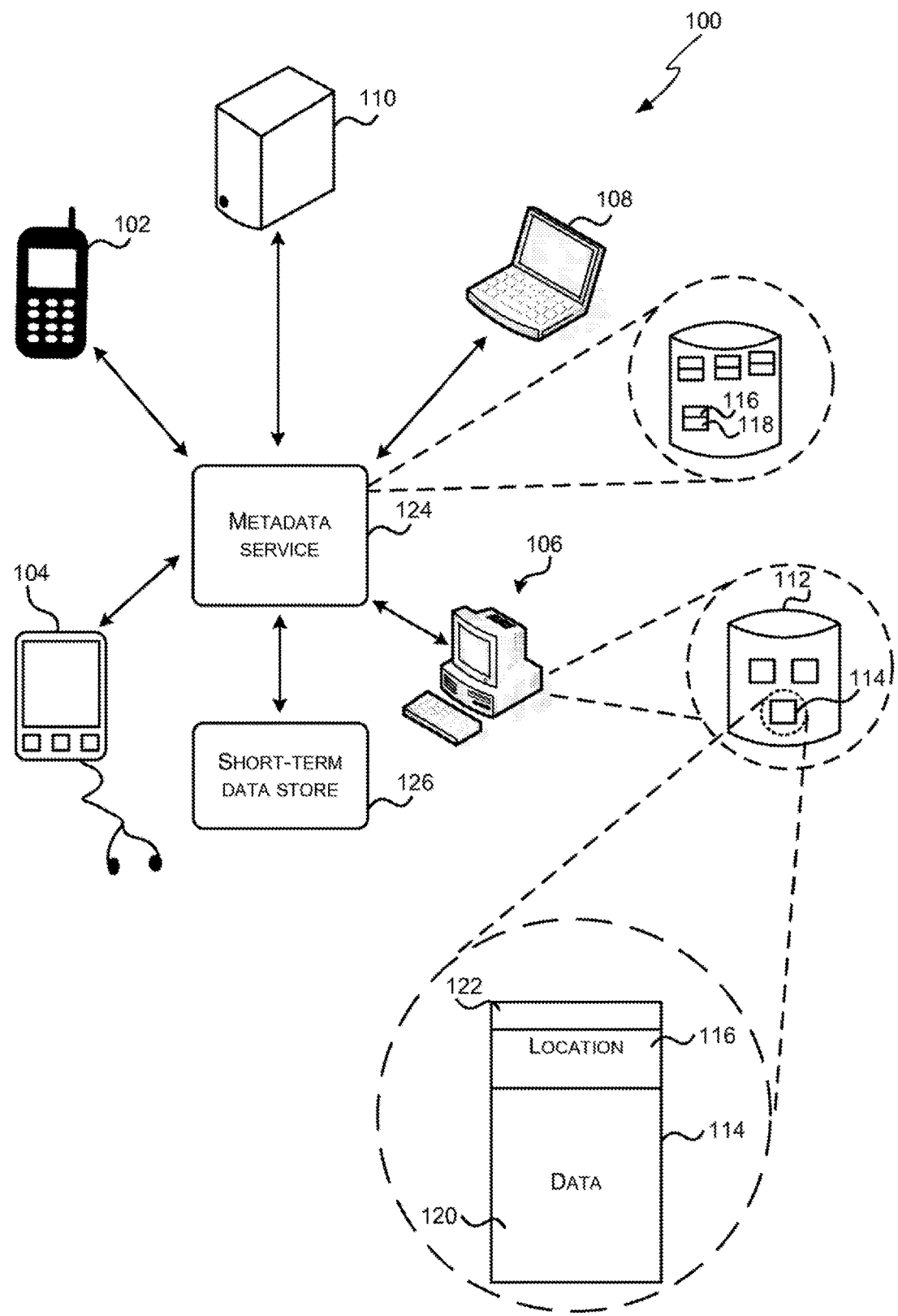
FIGS. 1 and 8 are schematic diagrams of example distributed data storage (or file) systems.

FIG. 1 is a schematic diagram of a distributed data storage (or file) system. In an embodiment, this system may be used in the non-enterprise/home/domestic space; however, the system may also be used in enterprises. The system 100 comprises a plurality of personal (or consumer) devices 102-110. Each of these devices 102-110 comprises a data store 112 (e.g. a file system or database) in which each data element 114 (e.g. a file or database record) has an associated location attribute 116. The location attributes 116 are stored within the data store 112 and are co-located with the bytes of data 120 themselves. The system 100 further comprises a metadata service (MDS) 124 which stores an availability attribute 118 associated with each data element 114 within the distributed data storage system 100 and also stores a copy of the location attributes 116 associated with each of the data elements within the system 100. The system 100 may also comprise a short-term data store 126.

The location attribute 116 comprises data which is representative of the geographical location of the data element and may be in any format. In an example, the location attribute may comprise a device and geographical location tuple, [device name, geographical location], for example, [laptop1, home]. Users may assign aliases to the geographical location data, for example, so that a geographical location of '0xff4566' means 'home'.

The availability attribute 118 comprises data which is representative of the availability of the particular data element on the device on which it is stored (where the device may be specified as part of the location attribute). The availability 118 attribute may, for example, have a default state of 'unavailable' for a particular data element and may be updated to 'available' when the device (i.e. the personal device) on which the particular data element is stored is switched on or when it has network connectivity such that it can communicate with the MDS 124. The data storage system 100 uses the availability attribute 118, and in some examples the location attribute 116, to manage the system including the personal devices and to provide strong consistency of data through time, i.e. the system provides a guarantee that any data element which is accessed is the most up-to-date version.

The location attribute 116 and availability attribute 118 are each set so that they can only be written (e.g. set and updated) by a single trusted entity in a similar manner to existing attributes 122 such as the file length, creation time and last modification time. The single trusted entity that can write location attributes 116 may be different to the single trusted entity that can write availability attributes 118. This single trusted entity is not a user or application software and in many embodiments is an operating system (e.g. an operating system on device 106 is able to write location attributes 116 for data elements stored on that device 106, an operating system on device 108 is able to write location attributes for data elements stored on that device 108). In other examples, the single trusted entity may be another piece of software which has been authorized I validated by the operating system in some way and the where the path between the piece of software and the attribute storage field is a 'secure path' (e.g. using appropriately hard encryption and hardware protection to avoid the program code being subverted) and consequently the piece of software may be considered trusted software. Application software can read location attributes 116 and availability attributes 118 (although in many examples, this attribute is mainly used by the data storage system itself), but applications cannot set or edit these attributes.

The location attribute 116 and availability attribute 118, as described above, are tightly bound attributes which are inviolable. Native support for the location attributes is provided in the data store (e.g. file system or database) on each of the personal devices 102-110. When a data element is moved or replicated, the location attribute moves with the data element and is updated by the single trusted entity (e.g. the operating system) and consequently replicas are now not an exact copy of the original since replication does not include the location element. This will change with the new location because its attribution is different. In another scenario, where a user connects a new device into the system, such as a music storage and playing device, which may store versions of files which are already stored elsewhere within the system, metadata relating to the new replicas within the system may be merged with existing metadata regarding the existing replicas in the system.

The availability attribute 118 is supported by the MDS, where the attributes are stored, and may or may not be the same for different replicas of the same data element. When a personal device becomes unavailable (e.g. it is powered down or loses its network connection), the availability attribute is updated by the MDS to reflect the change in status. Where a personal device performs a clean standby or shutdown operation, it may update the MDS and as a result the MDS updates the availability attribute 118 for any data elements (or copies of data elements) stored on that device. During an unclean standby (e.g. unexpected loss of network connection, battery failure), unavailability may be inferred by the MDS as a result of failure to receive a regular heartbeat message from the device or a client may report the unavailability of a device to the MDS when the client tries to contact the device and cannot. In another example, the MDS may regularly poll each device (e.g. every 10 seconds) to determine the availability of the data stored at the device. In this manner, the availability attribute may be maintained on a per-device basis first and then the availability of a data element deduced from the availability of the device. As a result, although there is an availability attribute 118 associated with each data element 114 within the system 100, a single availability attribute 118 may be associated with more than one data element 114. The MDS 124 may be described as tracking the availability of data elements.

The restriction in relation to which entities can write the location and availability attributes provides a high level of authenticity and the location and availability information can therefore be trusted and used by many different applications for many different purposes. New API calls may be provided to expose the availability information (which may also be referred to as dormancy information) to the file storage system and to provide the location information (and possibly also the availability information) to applications. The location attribute may, for example, be used to set access policies, which may also involve a location for the user accessing the file (e.g. File A can only be accessed from Location A). The availability attribute is used by the file system to manage the devices within the system and to manage access to data in order to provide strong consistency (as described in more detail below).

In an example, the data store may be an NTFS file system and the location attribute may be added to existing attributes, which in NTFS are referred to as 'Attribute Types' to distinguish them from 'FileAttributes' which are flags that can mark the file as read only I hidden I compressed etc (and are a subset of the possible attributes a file may have). Examples of existing attribute types in NTFS with the addition of the new attribute type, $FILE_LOCATION, are shown in the table below:

| Attribute Type | Description |
| --- | --- |
| $STANDARD_INFORMATION | General information about the file (which includes Creationtime, LastModificationTime, |

-continued

| Attribute Type | Description |
| --- | --- |
| | LastChangeTime, and LastAccessTime) |
| $FILE_NAME | Name of the file |
| $SECURITY_DESCRIPTOR | Security information about the file |
| $DATA | Data in the file |
| ... | ... |
| $FILE_LOCATION | Geographical location of the file or both the Device and Geographical location |

In another example, the data store may be an SQL Server® and in such an example, each database record may have an extra 'location' column as shown in the example table below:

| Column 1 | Column 2 | ... | Column n: Record Location |
| --- | --- | --- | --- |
| | | | |
| | | | |
| | | | |
| | | | |

Where a tuple of device and geographical location is used, there may be two extra 'location' columns or a single column containing both pieces of information.

It will be appreciated that although each data element has an associated location attribute which identifies a geographical location of the data element, in some systems the location attribute may not be explicitly specified such that the location attribute may be left blank or filled with a default or null value. A particular value for the location attribute may be used to indicate that the geographical location is not known and this may be the same as, or different from, the value which is used in systems which do not actively use the location attribute. In contrast, as described above, the availability attribute may have a default value of 'not available'.

As described above, the system 100 comprises a plurality of personal devices 102-110, where the personal devices are not all the same (i.e. they are a heterogeneous collection of personal devices). In the example shown, the plurality of devices 102-110 includes a smart phone 102, a music (or media) player 104, a desktop computer 106, a laptop computer 108 and a network attached storage device 110. One or more of these devices may be able to enter a dormant state. This dormant state may be a low power mode of operation and in some examples may be referred to as a 'standby' mode, in which the main processor of the device is switched off, and from which the device can be woken by the system 100 (e.g. on behalf of a client/application request). For the purposes of explanation only, where a device is described as being 'off', this may refer to the device being in such a dormant state or it may refer to the device being in a state from which it cannot be woken or in a state where it has no network connectivity. The term 'awake' is used herein to refer to a state when the main processor is operational.

When a device is dormant (e.g. in 'standby'), a processing element (which may be integrated within the Network Interface Card) may remain active to monitor events and wake the main processor when defined criteria are satisfied. This processing element may, for example, be provided on a hardware dongle (or key) which may be connected to the device by USB or other suitable connection. Such a hardware dongle is described in more detail in co-pending U.S. patent application Ser. No. 11/945,104, filed on Nov. 26, 2007, publication number: US-2009-0135751. In other implementations, the processing element may be integrated within the personal device. Where a device becomes dormant (i.e. it enters such a mode of operation in which the main processor is powered down and from which it can be woken), the availability attributes (stored in the MDS) for data elements stored on that device may remain set to indicate availability, e.g. by continuing to mark them as available or by setting the availability attribute to a value which indicates that the device is currently dormant but can be woken.

The MDS 124 in FIG. 1 may be located on one of the personal devices 102-110, however, in many implementations the MDS is located on a home server or hosted in the cloud (where the term 'cloud' is used to refer to a cloud computing system). In some implementations, the location of the MDS may be selected to be on the most available device within the system 100 and so where cloud computing resources are available, the MDS may be located in the cloud as this means that it is always available (i.e. the cloud does not get switched off). The MDS provides access to the location and availability information (stored as the location and availability attributes) for applications or other users of the data. As described above, the MDS stores location information and availability information for each data element in the system 100. The location information corresponds to the location attribute associated with each data element. When the location of a data element changes and the location attribute is updated, this change may be propagated to the MDS by the relevant data store (e.g. the data store may provide updates to the MDS periodically, e.g. every 10 seconds) or alternatively the MDS may periodically poll a device (and in particular it's data store) to confirm location information. The MDS also updates the availability attribute stored for each data element as devices become available or unavailable and this mechanism is described above. The MDS may therefore be described as tracking locations of data elements and receiving location and access requests from users. These attributes may be referred to as metadata stored by the MDS, and this metadata may be replicated within the system to increase reliability.

Figure 2:
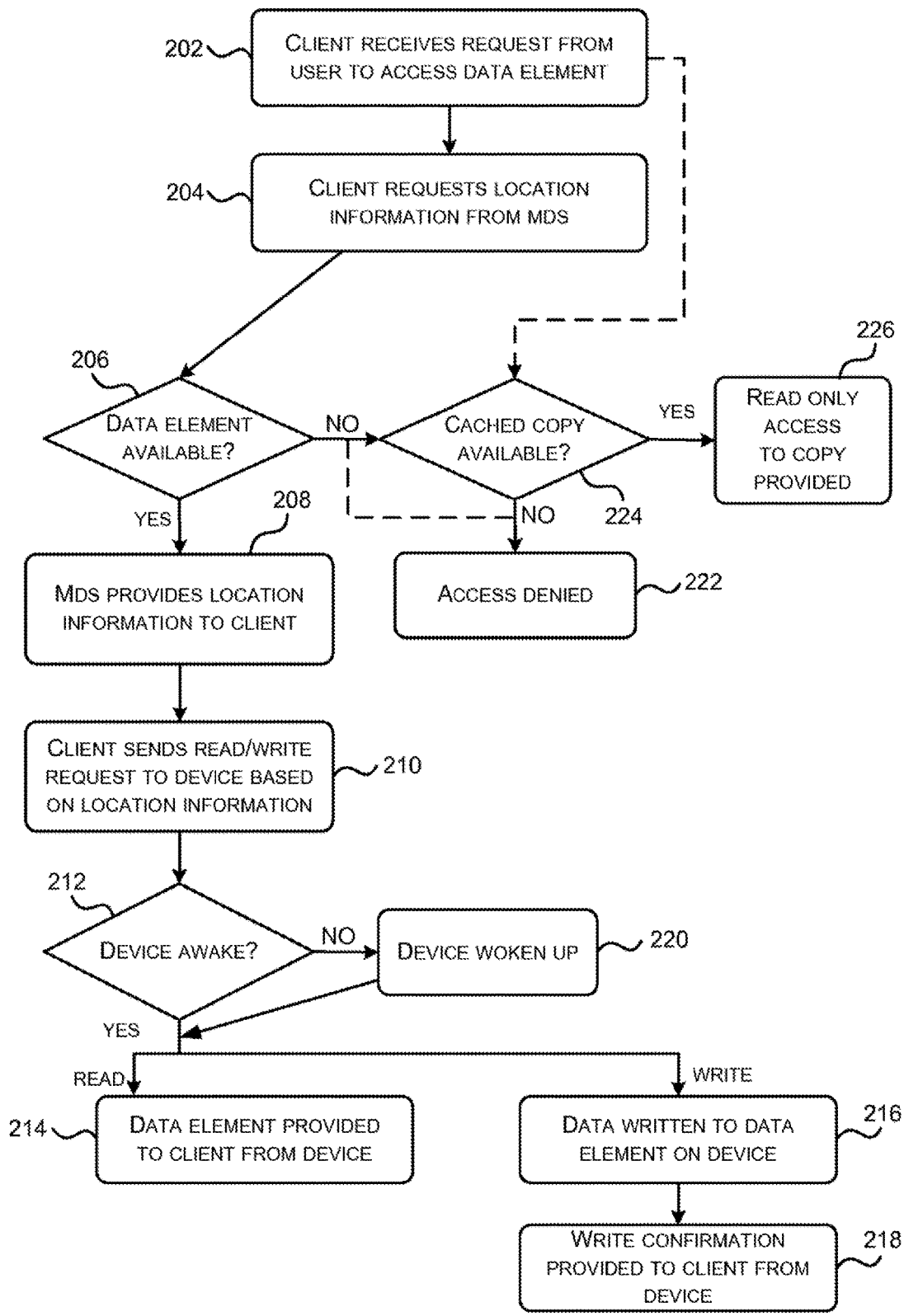
FIGS. 2, 4 and 7 are flow diagrams showing example methods of operation of the system of FIG. 1 or 8.
Figure 3:
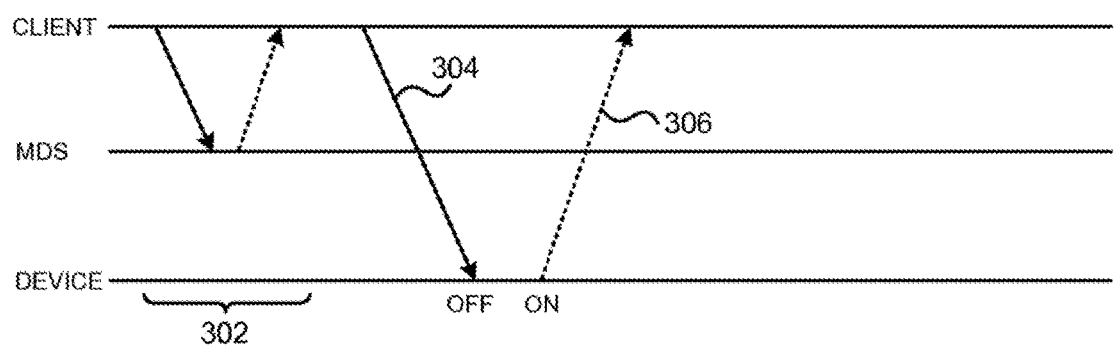
FIGS. 3 and 5 are diagrams showing message flows within the system of FIG. 1 or 8.

An example method of operation of the distributed data storage system shown in FIG. 1 can be described with reference to FIGS. 2 and 3. FIG. 2 is a flow diagram and FIG. 3 is a diagram showing message flows. When a client running on one of the personal devices 102-110 receives a request from a user to access a data element (in block 202), the client performs a MDS look-up 302. The client requests location information from the MDS for the particular data element (block 204) and the MDS determines if the data element is available (in block 206). This determination of availability is made by the MDS based on the availability attribute of the particular data element.

If the data element is available ('Yes' in block 206), the MDS provides the location information (from the location attribute) for the data element to the client (block 208). The client then uses this information to send a read / write request 304 to the personal device identified using the location information (block 210). If the device is awake ('Yes' in block 212), the request is serviced by the device immediately (in blocks 214-216). For read requests the data element is provided to the client (block 214 and message 306) and for write requests, the data is written to the data element on the device (block 216) and a confirmation is sent back to the client (message 306 and block 218) once the write has been performed. If the device is not awake ('No' in block 212), the device is woken (in block 220) before servicing the request (blocks 214-216) and this results in a short delay which is dependent upon the wake-up time of the device from the particular state that it is in.

If however, the MDS determines that the data element is not available ('No' in block 206) based on the availability attribute associated with the data element, the MDS may respond to the client with a message indicating that access to the data element is not possible (block 222). In some examples the client itself may determine if there is a cached copy of the data element which is available (e.g. stored locally on the personal device on which the client is running) before denying access (in block 222) and if such a cached copy exists ('Yes' in block 224), the user may be granted read only access to that copy (block 226). If there is not a cached copy available ('No' in block 224), then access is also denied (block 222). If the user modifies the cached copy, they will need to save the modified version as a different data element (e.g. under a different file name) and so there will be no confusion regarding which "copy" of a data element is the current version.

In situations where the client cannot access the MDS, such that it cannot send the MDS lookup message (in block 204), the client may either deny access to the data element (as in block 222) or may determine whether there is a local copy or cached copy of the data element (block 224) and if there is, may allow read only access to the copy of the data element (block 226). In some situations, the location of the data element (as specified by its location attribute) may actually be the device on which the client is running and in such a situation, this may be considered a local copy and so read access may be granted (in block 226). By not allowing write access to the data element when there is no connectivity to the MDS, even when the location of the data element is the local device, the system provides strong consistency at the expense of availability (i.e. the user is unable to work on the data in some situations). In some examples, this requirement may be relaxed through caching of the MDS metadata locally and this is described in more detail below with reference to flow 503 in FIG. 5.

Where access to a data element is denied (in block 222), a user interface may provide the user with details of where the unavailable data element resides or the reason for the denial. In an example, this interface may display a message saying "Access to file.xls is not possible. The file is located on device 'laptop' which is currently unavailable" or "Access to file.doc is not possible because the file is located on device 'laptop' and you do not have any network connection". In any of the examples described herein, a file manager application may display location and/or availability information for files based on the location and availability attributes of those files (e.g. as extracted from locally cached MDS metadata).

In some examples of the data storage system, replication may be used for improved reliability. As described above, a replica of a data element is not an exact copy of the original data element because the value of the location attribute will be different. In some examples, every data element may be replicated with one or more replicas of the data element being stored on different devices and in other examples, the replication policy may be specified on a per data element basis such that some data elements may be replicated and others may not, and different data elements may be replicated different numbers of times. Furthermore, the number of replicas of a particular element may not be fixed but may change with time, e.g. based on system load. In some examples, the degree of replication used (e.g. the number of replicas or whether replication is used at all) for a data element may be linked to the location attribute. For some locations, such as portable devices, replication may be used for reliability and increased availability, while for static devices (e.g. network attached storage, desktop computers, or cloud based storage), a policy may define that no replication or a reduced degree of replication is used.

Where replication is used, multiple instances of the same data element are stored within the data storage system and one instance of a replicated data element is designated as the primary (or primary replica I copy I version) with the other instances of the data element being referred to as secondaries (or secondary replicas I copies I versions). Reads and writes of the data element are directed to the primary by the MDS and if the device which stores the primary is switched off or otherwise becomes unavailable, the primary designation is migrated to another of the instances of the data element (i.e. one of the secondaries becomes primary instead of the primary which is, or is about to become, unavailable). Primary migration may also occur in other instances, for example as described below with reference to FIG. 7.

An example method of operation of the distributed data storage system shown in FIG. 1 which uses replication for one or more data elements can be described with reference to FIG. 4, which is a flow diagram, and FIG. 5, which comprises two diagrams showing message flows. The method starts as described above with reference to FIG. 2, with the client requesting location information from the MDS (in block 204) in response to a request received from a user (in block 202). As described above, reads and writes of any data element are directed to the primary and so the MDS checks whether the primary for the data element is available (in block 406) and if it is, the MDS provides the client with location information for the device which holds the primary (block 408). In FIG. 5 the device D1 which holds the primary is denoted D1 (p) to distinguish it from a device D2 which holds a secondary replica. The client can then send the read I write request to the device (block 210). If the device is awake ('Yes' in block 412) then the request can be serviced immediately (e.g. as in the example 'read' message flow 501 and 'write' message flow 511), but if the device is not awake, the device holding the primary is woken up (block 220, e.g. as in the example 'read' message flow 502).

If the request (in block 210) is a read request, the device holding the primary provides the data element to the client (in block 214). If, however the request (in block 210) is a write request, the data is written to the data element on the device which stores the primary (in block 216) and is also written to the devices storing secondaries (block 417), e.g. device D2 in the example of FIG. 5.

In situations where the client cannot access the MDS, such that it cannot send the MDS lookup message (in block 204), the client may either deny access to the data element (as in block 222) or may determine whether any of the secondary replicas or a local I cached copy or other copy of the data element is available (block 424) and if there is a copy available the client may allow read only access to the copy of the data element (block 226). In some situations, the location of the data element (as specified by its location attribute) may actually be the device on which the client is running and in such a situation, it may actually be the primary that the client allows read access to (in block 226). By not allowing write access to any of the replicas of a data element when there is no connectivity to the MDS, even when the primary is stored on the device on which the client is running, the system provides strong consistency.

As described above, in some systems, some data elements may be replicated and others may not. Consequently, a data storage system may operate as described above with reference to FIGS. 2-3 for data elements which are not replicated and may operate as described above with reference to FIGS. 4-5 for data elements which are replicated.

In the example methods described above, the client accesses the MDS for every read I write request (in block 204). However, in some implementations (e.g. of FIG. 2 or 4), the client may cache the MDS metadata locally (i.e. on the particular personal device on which the client is running). In such an implementation, a client may store the metadata (e.g. all the metadata, rather than just the metadata for the particular data element) the first time they access a data element and then contact the MDS to update the metadata when subsequent accesses to data elements on devices fail (i.e. upon failure of a read/write request). In an alternative implementation, a client may access the MDS on start up and cache the metadata locally in preparation for subsequent data access requests. This means that block 204 may be omitted from the flow diagrams of FIGS. 2 and 4 where cached metadata is available and this cached metadata may be used to obtain location information (instead of blocks 208 and 408). Where no response is received following the request sent in block 210, such that the access fails, the method blocks may revert back to block 204 and contact the MDS for the updated location information for the required data element and to update the cached metadata. The metadata may also be updated periodically.

The operation of such a system can be described with reference to the example 'read' message flow 503 in FIG. 5. In this example, subsequent to the initial MDS lookup (messages 204 and 408 in FIG. 5) when the metadata was cached locally, the original device holding the primary for the data element, DI, is turned off and the primary is migrated to D2, such that it is now denoted D2(p). There are many mechanisms by which the primary may be migrated, and in the example shown in FIG. 5, the device D1(p) notifies the MDS that it is shutting down and so releases its role as holding the primary replica (message 531) and consequently the MDS updates its records and selects device D2 as the replacement holder of the primary replica of the data element. The MDS sends D2 a message 532 which notifies D2 that the replica it holds of the particular data element is now the primary. Co-pending U.S. patent application Ser. No. 12/714,223, filed Feb. 26, 2010 provides an example of a more detailed mechanism for primary migration. When the client tries to access the data element from its original location, DI (message 533), no response is received because DI is off and DI is not woken by the system as it does not hold the primary replica. Consequently, the client's read request times out and this initiates a new metadata lookup (messages 534-535) which may be performed as described above with reference to FIG. 4 (blocks 204, 406 and 408) or the MDS may simply provide the metadata to the client in response to the request (in block 204). At this point the cached metadata may be updated. The client can then access the data element in the new location, D2(p), as described above (e.g. block 408 onwards in FIG. 4).

In the example described above with reference to message flow 503 in FIG. 5, primary migration occurs as device DI is shutting down in a controlled manner (which may also be referred to as clean shutdown/standby). In a situation where the device holding the primary does not shut down (or otherwise become unavailable) in a controlled manner (also referred to as unclean shutdown/standby), for example because a power or network lead is unexpectedly removed from a device, the device is unable to release the primary before becoming unavailable. In such an instance, the system may deny access to any data elements where the primary is stored on the device DI. Alternatively, the MDS may perform primary migration and either the device DI may automatically release primaries when it becomes available again or the MDS may notify the device as soon as it reconnects to the MDS that it no longer holds the primary for some data elements. In a further example, primaries may be allocated on a 'lease' basis, such that a device (e.g. DI) holds the primary replica for a defined period of time and at the end of that period the lease may be renewed. If a request comes in for a data element where the primary is stored on DI after DI has performed an unclean shutdown I standby and cannot be woken up, the MDS migrates the primary to another device (e.g. D2). Where the primary lease expires before a request for a data element comes in, the MDS will migrate the primary from D1 at this point.

In the examples described above, the time taken to respond to a client request (received in block 204) is dependent upon whether it is necessary to wake the device on which the data element is stored, and in the case of a write request where the data element is replicated, it may also be dependent upon whether it is necessary to wake any of the devices which store secondary replicas of the data element (i.e. where the request is not confirmed to the client until the data has been written to all of the replicas). In order to reduce the delay which is incurred in the situation where one or more devices storing secondaries are not immediately available (e.g. because they are dormant and need to be woken or are off or without connectivity to the MDS), the writes may be written into alternative storage, in a process which may be referred to as 'off-loading' and then when the devices wake up subsequently (or otherwise become available), the data may be written to the secondary replicas in a process referred to as 'reclaim'.

The alternative storage may be provided by a short-term data store 126 (e.g. as shown in FIG. 1) and this data store may be provided anywhere within the system, e.g. on any of the personal devices 102-110, on a home server or in the cloud. In many implementations the MDS 124 and the short-term data store 126 are located in the same place, e.g. both on a home server or both in the cloud; however, in other implementations, the MDS and short-term data store may be located in different places. In addition, some distributed data storage systems may comprise more than one short-term data store. As with the MDS, the short-term data store 126 may be located on the most available device within the system 100.

Figure 4:
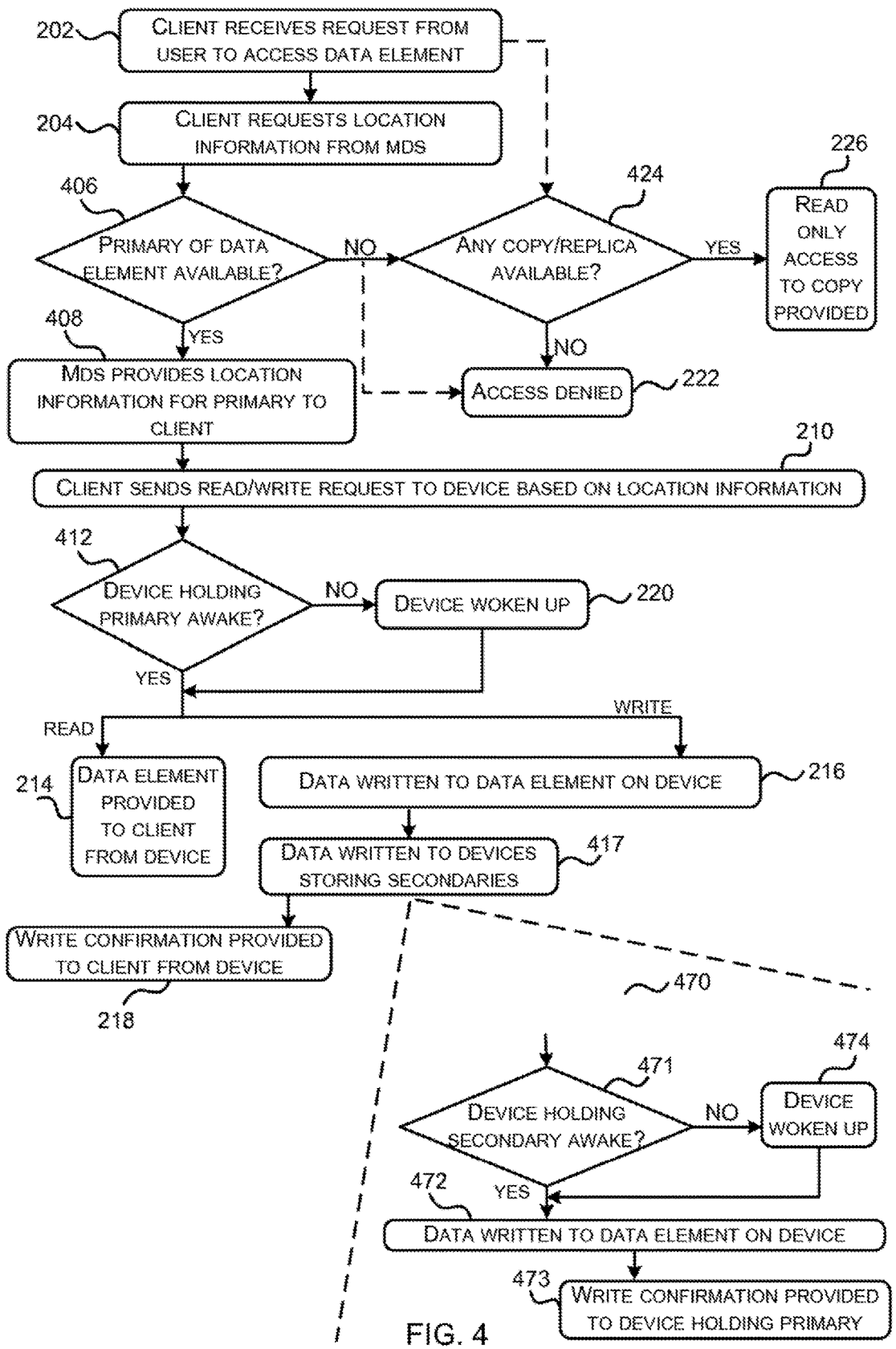
Figure 5:
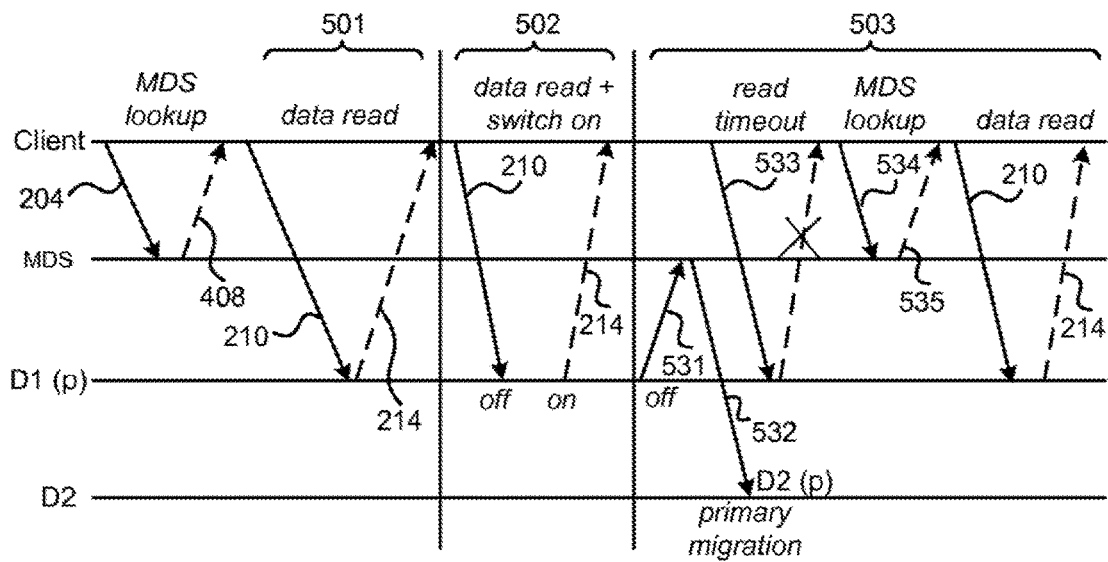
Figure 5:
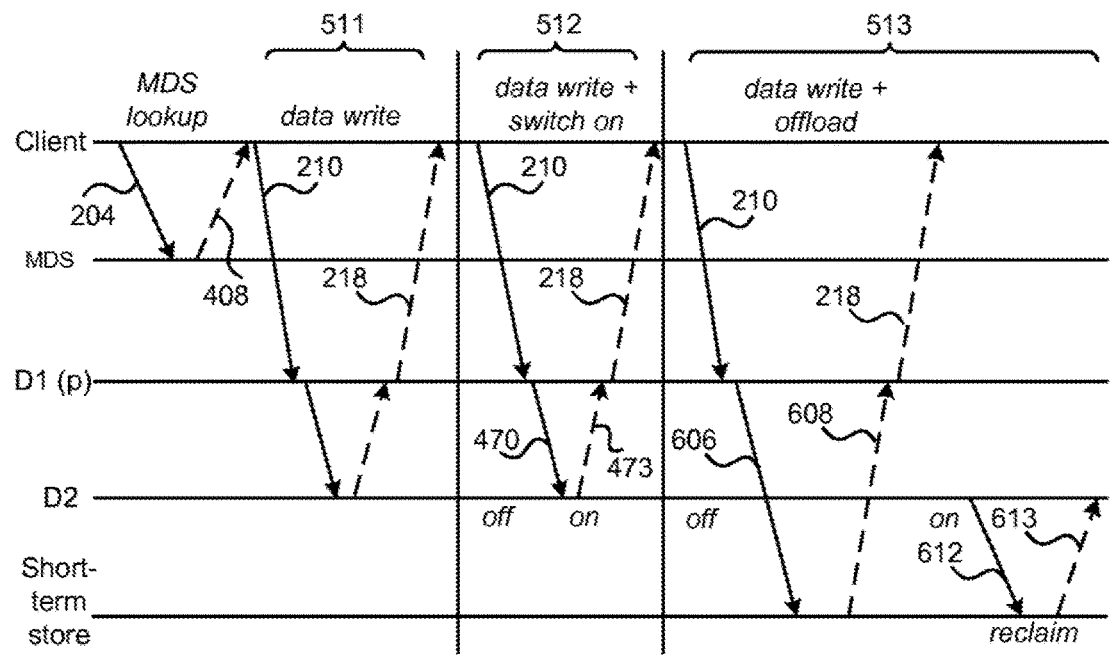
Figure 6:
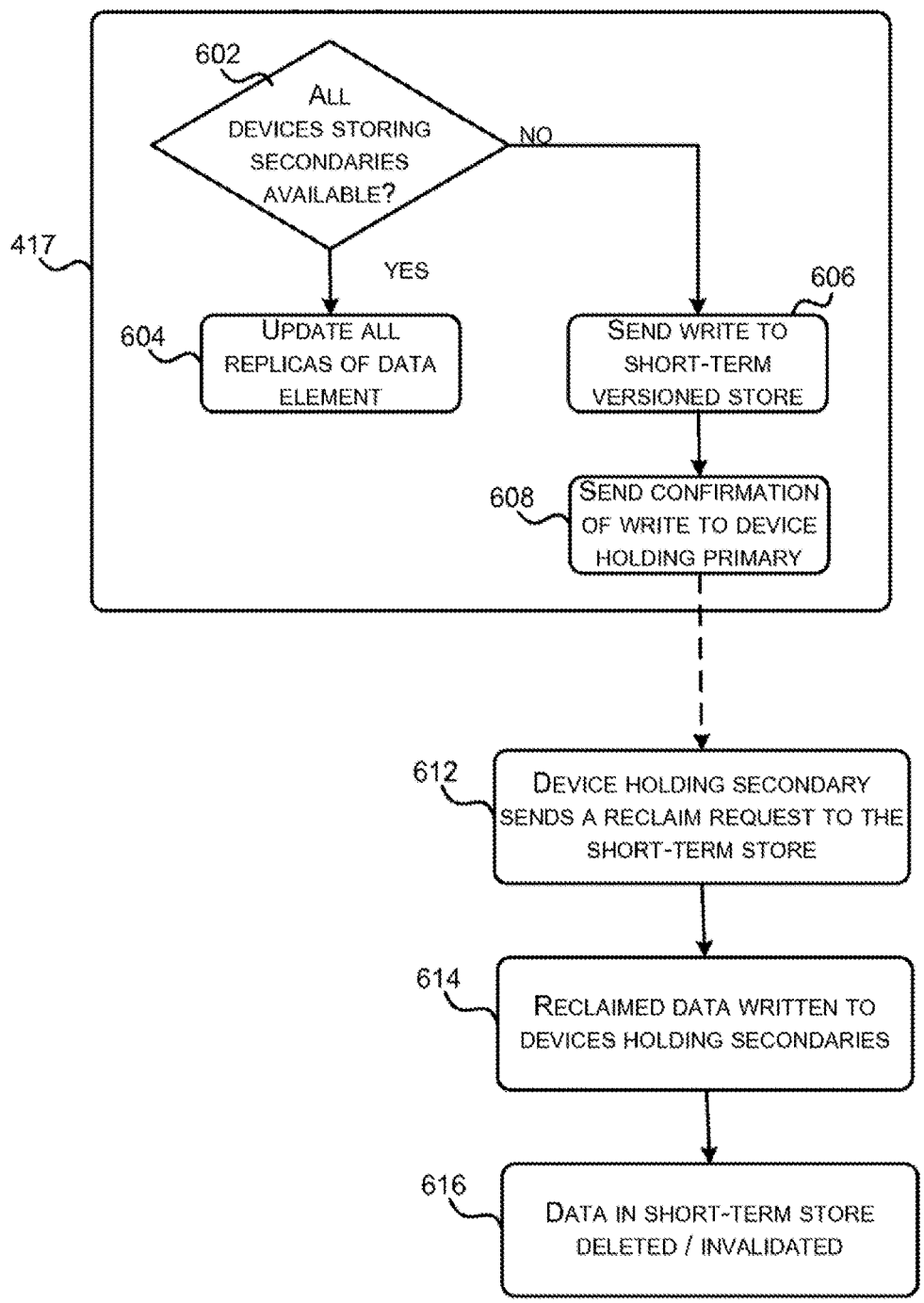
FIG. 6 provides another example implementation of one of the method steps in FIG. 4 or 7.

The process of off-loading writes can be described with references to FIGS. 4 and 6. FIG. 4, as described above, shows an example method of operation of the data storage system where replication is used and FIG. 6 is a flow diagram showing another example way in which data may be written (i.e. it provides another example implementation of block 417 in FIG. 4). The method proceeds as shown in FIG. 4 and described above, and for write requests, the data is written to the primary version of the data element (in block 216). If all the devices storing secondaries are available ('Yes' in block 602), all the replicas of the data element are updated according to the write request (block 604) and then confirmation of the write can be provided to the client (block 218). However, if not all the devices storing secondaries are available ('No' in block 602), where devices may be unavailable, for example, because they are in a state from which they could be woken or in a state from which they cannot be woken, the write is sent to the short-term store 126 (block 606). In order to maintain the correct number of replicas of a particular data element, multiple copies of the write may be stored in the short-term store. Co-pending U.S. patent application Ser. No. 12/059,695, filed Mar. 31, 2008 (publication no. US-2009-0249001) provides an example of a more detailed mechanism for write off-loading.

In the example described above D1, which holds the primary for a data element, performs an unclean shutdown/ standby, which causes the MDS to migrate the primary from D1 to another device D2 and then device D2 can service read requests. Where replication and write off-loading are both used, in this situation write requests will be off-loaded because one of the secondaries, DI, is unavailable. The third 'write' message flow example 513 in FIG. 5 also shows the off-loading of writes. As in the previous write example 512, the client sends the write request to the device D1(p) which holds the primary (block 210 of FIG. 4). As the device D2 which stores a secondary is off, the write request is sent instead to the short-term store 126 (block 606). Confirmation of the write to the short-term store is sent back to the device D1(p) which holds the primary (message 608) and then the confirmation of the write is sent to the client (block 218).

Subsequently, when all the devices holding secondaries are available, the data in the short-term store is reclaimed, as shown in FIGS. 5 and 6. The device holding the secondary replica (D2 in the example of FIG. 5) sends a reclaim request to the short-term store (block 612), receives the write data (message 613) and this data, which may be referred to as reclaimed data, is written to the device holding the secondary (block 614). The data in the short-term store can then be deleted or invalidated (block 616). Where the data is invalidated, it may be removed from the short-term data store 126 in a subsequent garbage collection process.

Although FIG. 1 and the method described above with reference to FIGS. 5 and 6 show only a single short-term store 126, in some examples there may be multiple short-term stores. In such a system, the method may comprise an extra step (e.g. between blocks 602 and 606), in which a short-term store is selected for use. In an example, the short-term store may be selected based on a cost function, where the cost function may be dependent upon one or more factors such as location (e.g. relative location of the user and a short-term store), bandwidth of connection between the client and a short-term store, battery state, etc. In an example, a cloud-based short-term store may be used by default where it is available or where the bandwidth of the connection between the client and the cloud exceeds a threshold value and in another example, a short-term store which is local to the client may be used where the client is running on a personal device with limited remaining battery life. In another example, a user may specify when the cloud may be used for off-loading, e.g. for space I privacy I cost reasons. In another example, the off-loading may use another personal device as a short-term store in preference to a cloud-based short-term store where there is a higher bandwidth connection to the other personal device than to the cloud-based short-term store. This would provide improved performance but potentially impact the user experience of anyone using that other personal device. Where a write is offloaded to a short-term store on a personal device (or other device) which is not always available, it may be necessary to wake that device to access the writes (e.g. in response to subsequent access requests or to perform reclaim). This is not necessary for cloud-based short-term stores as they are always available.

Figure 7:
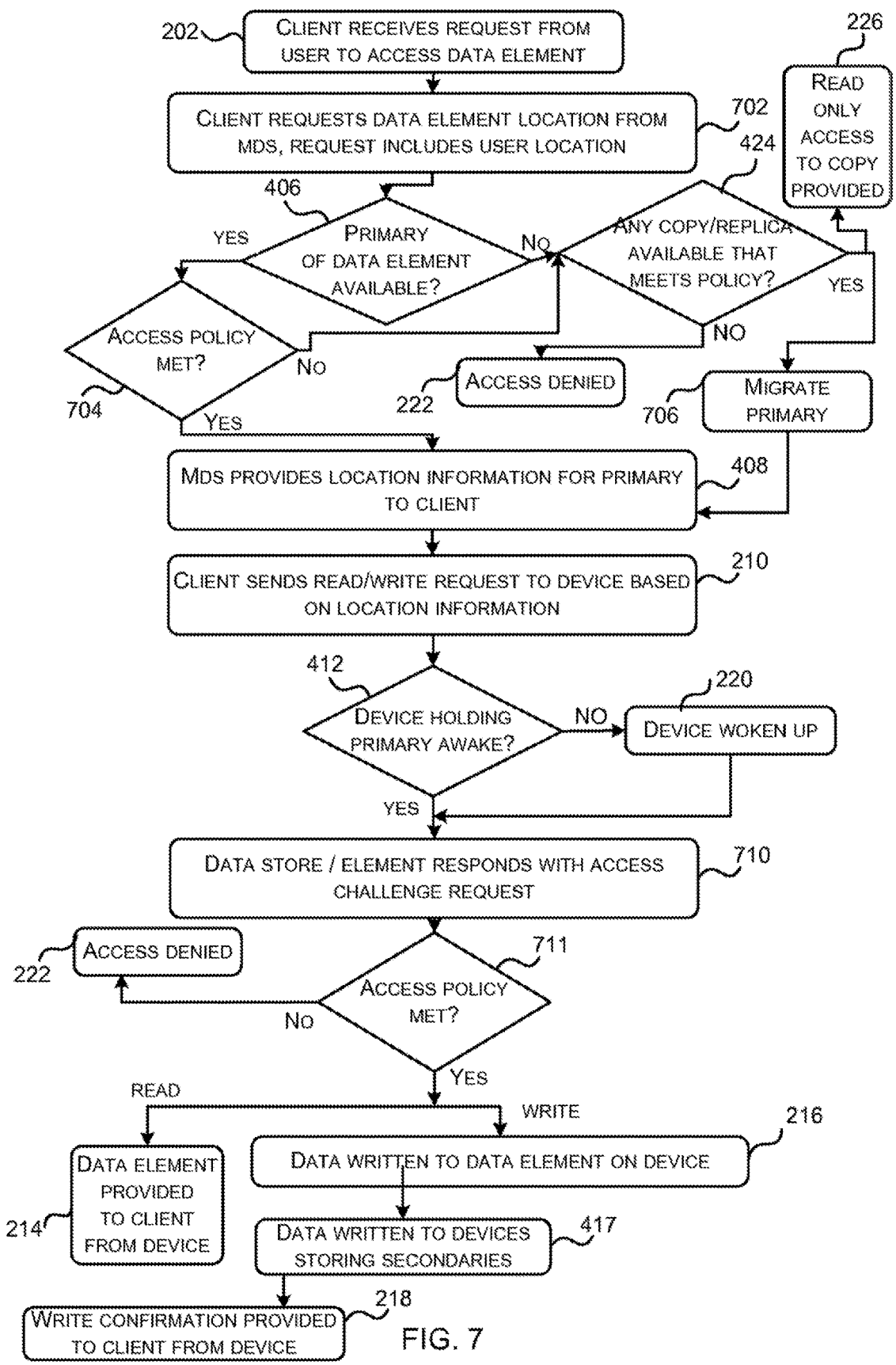

An example method of operation of the distributed data storage system shown in FIG. 1 which uses replication and location based access control can be described with reference to FIG. 7, which is a flow diagram. The method starts as described above with reference to FIG. 2, the client receiving a request from a user to access a data element (block 202). In response, the client requests location information from the MDS and in this example, the request received from the client includes location information for the user (block 702). This location information may be determined in any way, e.g. using a GPS device within the personal device operated by the user or based on the network connection point of that personal device (e.g. cell site for a smart phone). The MDS checks whether the primary for the data element is available (in block 406) and if it is, the MDS determines if the location of the primary and/or the location of the user satisfies a location based access policy for the particular data element (block 704). If the access policy is met ('Yes' in block 704), the MDS provides the client with location information for the device which holds the primary (block 408).

The access policies may be stored at the MDS (and in some examples may form part of the MDS metadata which is cached locally) and may be defined in terms of the location of the user and/or the data element (e.g. File A can only be accessed when it is stored in location A and/or when the user in location A). There may be some data elements which have access policies specified and others that do not. In some examples, different access policies may be specified dependent upon whether the request is for read or write access. In some examples, the access policies may be relative, for example, one that requires that a user accesses the closest replica (where the term 'close' may be defined geographically or based on a cost function such as the function described above).

If the primary for the data element is not available ('No' in block 406) or the access policy is not met based on the location of the primary and/or the user ('No' in block 704), the MDS determines whether any replica of the data element is available which meets the access policy (block 705), e.g. a replica stored at location A in the example given above. If no such replica exists, ('No' in block 705), access to the data element is denied (block 222). If, however, a replica does exist which satisfies the access policy ('Yes' in block 705), the system may allow read only access to the replica (block 226). Alternatively, the system may migrate the primary to this replica (block 706), e.g. from its current location to location A, and then the MDS provides the client with location information for the device which holds the primary (block 408). This primary migration may be described as reactive as it is in response to receipt of a particular request for data. In some examples, the MDS may proactively migrate primaries so that they are close (where this may be defined in a number of different ways) to those clients which regularly access them (e.g. to provide an improvement in efficiency).

Having provided the client with location information for the primary (in block 408), the client sends a read/write request to a device based on the location information (block 210) and the method may then proceed as described above with reference to FIG. 4 (block 412 onwards). Alternatively, the data store/element may perform another check on the location based access control policy (block 711) and this may also involve requesting current location information from the user (block 710). If the access policy is met ('Yes' in block 711), the method may proceed as described with reference to FIG. 4 (with block 214 or 216 and subsequent blocks).

Figure 8:
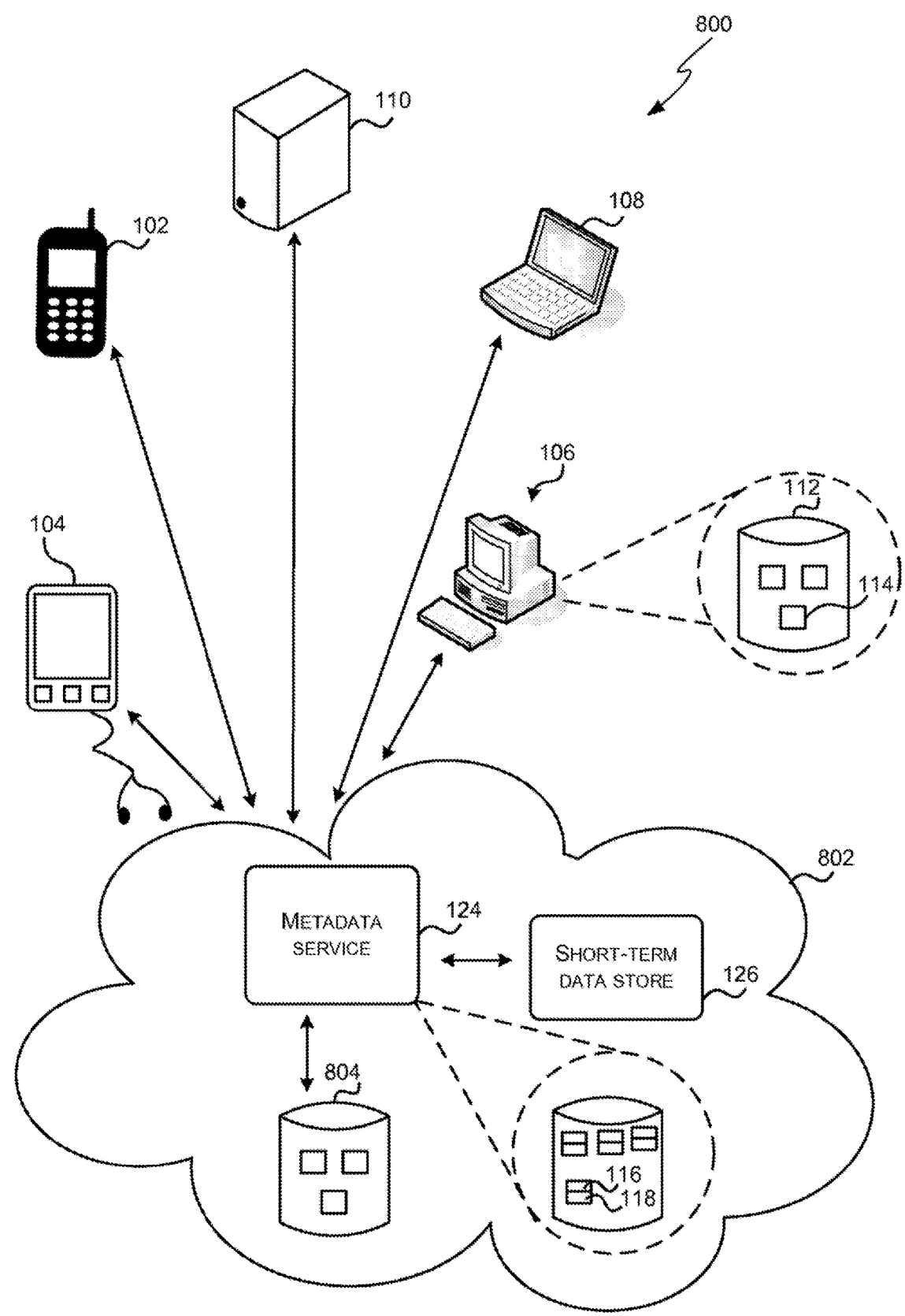

FIG. 8 is a schematic diagram of another example distributed data storage (or file) system which although it is designed for the non-enterprise/home/domestic space, may also be used in enterprises. The system 800 is similar to that shown in FIG. 1; however, in FIG. 8, the metadata service 124 and the short-term data store 126 reside in the cloud 802. In some examples, there may also be additional data storage 804 within the cloud and this may be managed by the data storage system 800 in a similar way to any of the other personal devices 102-110. The methods described above with reference to FIGS. 2-7 may also be implemented in the system 800 shown in FIG. 8. The system shown in FIG. 8 wakes up devices transparently to maintain consistency and availability (as does the system in FIG. 1) and also incorporates the cloud in its design, thereby leveraging a property that users are usually (if not always) at least weakly connected to the cloud i.e. such that they have a low bandwidth connection to the cloud which gives the ability to at least retrieve metadata from the MDS. The system stores the metadata on the cloud and trades off temporarily storing and retrieving data from the cloud, versus waking up a personal device where the data ultimately resides, e.g. based on factors such as the bandwidth or cost of the connection to the cloud, the battery remaining on a personal device, the 'cost' of waking a device (e.g. in terms of time or money) etc. In an example, the data may be off-loaded by default into the cloud even if a device is woken up in parallel (which may, for example, take 2-10 seconds in a current implementation). The reclaim process may then be performed once a device has been woken up.

In the examples above, there is a separate location attribute 116 for each data element 114 and a separate availability attribute 118 for each data element and the location attribute forms part of the file/record itself, with the availability attribute being stored at the MDS; however, in some examples, a location/availability attribute may reside within the data store general metadata such that a collection of data elements have the same associated location/availability attribute (such that each data element still has an associated location attribute and availability attribute but there is not a 1:1 relationship between data elements and location/availability attributes). Where a user has many data elements (e.g. files) and the data elements are very mobile (i.e. they change geographical location frequently) or where the availability of a data element changes often (e.g. because one of the devices 102-110 has a poor network connection), it may be more efficient to use this approach as instead of updating the location/availability attribute of each data element, the location/availability attribute of the collection is updated.

Figure 9:
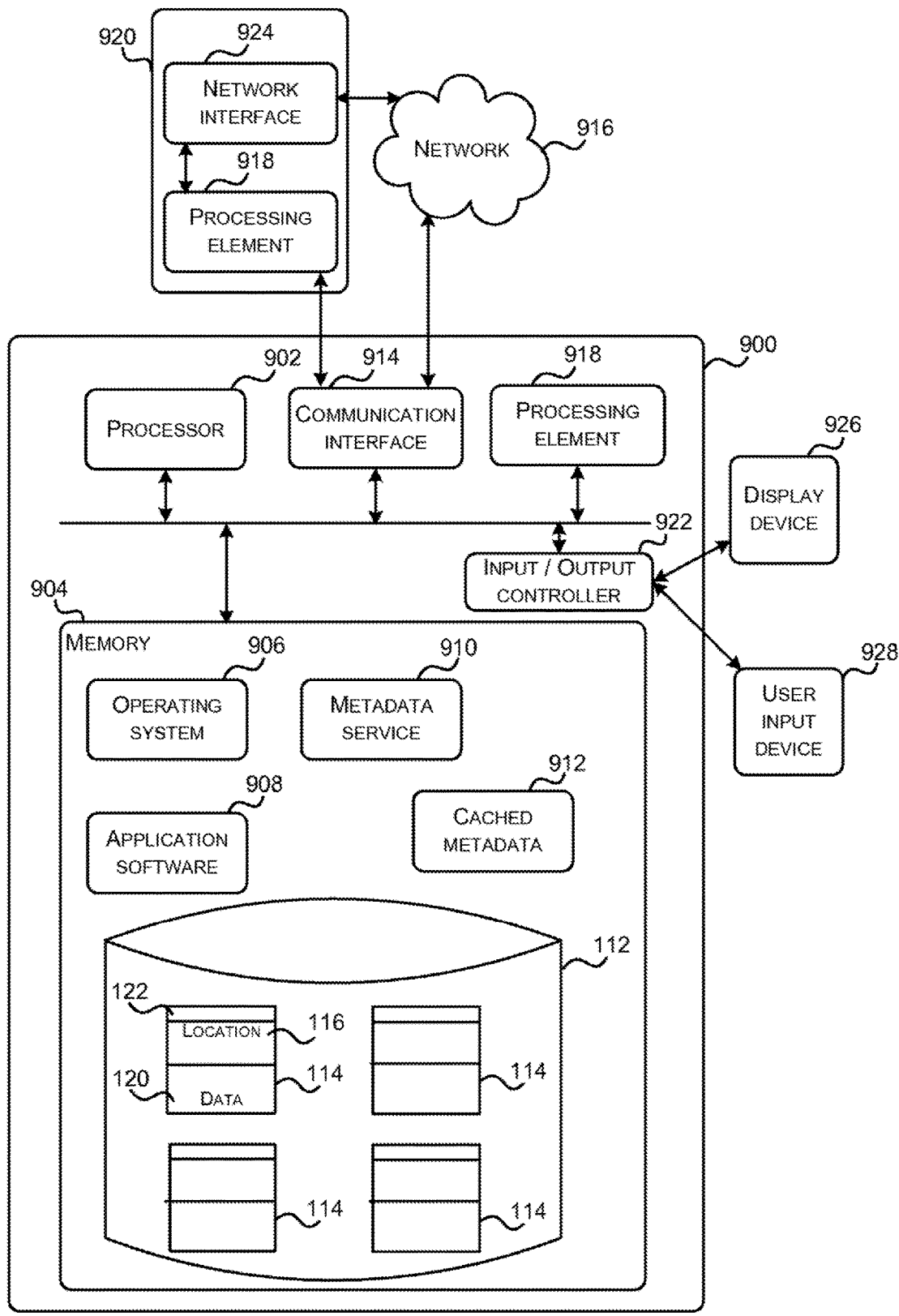
FIG. 9 illustrates various components of an exemplary computing-based device which may be implemented as any form of a computing and/or electronic device, and in which embodiments of the methods described above may be implemented.

FIG. 9 illustrates various components of an exemplary computing-based device 900 which may be implemented as any form of a computing and/or electronic device, and in which embodiments of the methods described above may be implemented. The computing-based device 900 may be a personal (or consumer) device within a distributed data storage system as described herein.

Computing-based device 900 comprises one or more processors 902 which may be microprocessors, controllers or any other suitable type of processors for processing computer executable instructions to control the operation of the device in order to access data elements stored in the distributed data storage system. In some examples, for example where a system on a chip architecture is used, the processors 902 may include one or more fixed function blocks (also referred to as accelerators) which implement a part of the method of the access methods in hardware (rather than software or firmware).

The computer executable instructions may be provided using any computer-readable media that is accessible by computing based device 900. Computer-readable media may include, for example, computer storage media such as memory 904 and communications media. Computer storage media, such as memory 904, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media.

Where the computing-based device 900 comprises data storage capability, the memory 904 may comprise a data store 112 (as described above). Platform software comprising an operating system 906 or any other suitable platform software may be provided at the computing-based device to enable application software 908 to be executed on the device. As described above, this operating system 906 (or other trusted software) writes the location attribute 116 for locally stored data elements 114. Application software 908 may read these attributes and use the information but cannot edit the attributes. As described above, the metadata service 910 may reside on the computing-based device 900 or metadata 912 from the metadata service may be cached on the device 900 for reliability and/or for local use to reduce the number of calls which are made to the MDS.

The computing-based device 900 further comprises a communication interface 914 which enables the device to be connected to other devices via a network 916 or other communication links. This communication interface 914 enables the device, when awake, to connect to the MDS, where the MDS is not located on the device. As described above, the computing-based device 900 can enter a state in which the main processor 902 is powered down but a processing element 918 is powered. This processing element 918 may be integrated within the device 900 or may be in a separate device or module 920 which may be connected to the computing-based device 900 via the communication interface 914 or the input/output controller 922. As described above, the processing element 918 determines when to wake the main processor 902 based on signals received from the MDS or from other devices. Where the processing element 918 is in a separate device or module 920, which may be in the form of USB key/dongle, the separate device 920 also comprises a network (or communication) interface 924 which maintains network connectivity of the device 900 whilst the main processor is off. This separate device or module 920 may, in some examples, be a removable module and in other examples may be built into the computing-based device 900 and not easily removable.

The computing-based device 900 may also comprise an input/output controller 922 arranged to output display information to a display device 926 which may be separate from or integral to the computing-based device 900. For example, where the computing-based device 900 is a portable device such as a smart phone, camera or media player, the display device 926 is likely to comprise an LCD screen which is integrated into the device 900. The display information may provide a graphical user interface. The input/output controller 922 is also arranged to receive and process input from one or more devices, such as a user input device 928 (e.g. a mouse, trackball or a keyboard). This user input may be used by a user to request access to a data element (as received by the client in block 202 of the flow diagrams). In some embodiments the display device 926 may also act as the user input device 928 if it is a touch sensitive display device (e.g. where the device 900 is a smart phone or tablet computer). The input/output controller 922 may also output data to devices other than the display device, e.g. a locally connected printing device (not shown in FIG. 9).

The systems 100, 800 described above each comprise a plurality of devices 102-110 and each device comprises a data store 112 which supports the location attribute. Each device need not be running the same operating system; however these devices each run an operating system or other trusted software which supports the location attribute. A distributed data storage system, as described above, may further comprise one or more devices which comprise data stores which do not support the location attribute. In such a system, additional software may be run on the device which interfaces between the local data store and the MDS and between applications and the data store and which manages the location attributes on behalf of the operating system and which makes the requests for data from the MDS.

In the systems 100, 800 described above, one or more of the devices may have the capability to be woken from a dormant state using a processing element (e.g. processing element 918 in FIG. 9) which remains active when the main processor (e.g. processor 902) is powered down and which wakes the main processor in certain situations (e.g. when a message is received from the MDS). Other mechanisms, including non-hardware mechanisms such as Wake On LAN, may alternatively be used to wake personal devices (e.g. dormant primaries) under the control of the system (e.g. Wake On LAN packets may be sent from the MDS to the relevant personal device). Although such alternative mechanisms may have limitations as to when they can be used, e.g. Wake On LAN requires two devices to have a link layer connection and is not supported by all networks or network interface cards, in some implementations a third device may be used to wake the device with the data (e.g. a dormant primary) on behalf of the device requesting the data. Referring back to FIGS. 1 and 8, if a device 110 has Wake on LAN capability but does not have a separate processing element (as described above) and another device 108, which may be connected to the same LAN as device 110, is awake or can be woken using the mechanism described above which includes a processing element in device 108, then device 110 may be woken by the system by sending a message to device 108 requesting that it send a Wake On LAN packet to device 110. As a result, when device 110 is dormant, the data elements stored on that device may continue to be marked as available because there is a mechanism by which the device can be woken.

The systems 100, 800 described above may further comprise one or more devices which do not have storage capabilities (i.e. that do not comprise a data store). In an example, a system may comprise a television which has no storage capability, but content (e.g. media files) can be streamed to the television for display to a user. Such devices may use the methods described above to access data elements via the MDS and data elements are read from the devices on which they are stored.

In the examples described above, the location and availability attributes are written by a single trusted entity (where the trusted entity which writes availability attributes may be different to the trusted entity writing location attributes) or by other software which has been authorized by that single trusted entity. In a variation to this, the attributes (and in particular the location attribute) may have associated access permissions which define who is able to read and/or write the attribute. These access permissions may, in some examples, be location based (e.g. as described above for data elements themselves with reference to FIG. 7). In some examples, the permissions for a data element's metadata (which includes the location attribute) may be linked to the permissions for accessing the data element itself.

Although the present examples are described and illustrated herein as being implemented in a home (or non-enterprise) system in which the devices may be personal or consumer devices, the system described is provided as an example and not a limitation. As those skilled in the art will appreciate, the present examples are suitable for application in a variety of different types of systems and may also be used in enterprises.

Examples of the systems and methods described above enable any data element to be accessed from anywhere and do not require a user to pre-plan for this remote access of data on one of their personal devices (e.g. by preorganizing data). Data by default may remain on the device where it was first created. The system allows flexible policies to be used for choosing the device to read from and the device to offload to. For example, a policy of nearest awake device could be used to read data (e.g. as the access policy in FIG. 7), whereby the device that has good bandwidth to/from the client may be used to write data.

Examples of the system and methods described above enable a user to emulate a system where all the data is stored in the cloud (and hence is always available when there is a connection to the cloud), but without requiring significant resources in the cloud. This may be particularly applicable to home users who may only have access to a small amount of data storage in the cloud (e.g. where cloud resources are expensive). Different implementations may use the cloud to differing degrees for data storage and this may be a user-configurable parameter. In an example, a user may specify a limit on the amount of cloud resources (e.g. 5 GB), that may be used for metadata and in some cases also data. In another example, a user may specify that only metadata (and not the data elements themselves) can be stored in the cloud.

Examples of the systems and methods described above may enable the data storage system to optimize the use of the available data storage within the system. For example, where a device runs short of local storage space, data elements may be stored on other devices instead or data which is not accessed very often may be moved onto another device. In addition, through primary migration, the use of network resources can be optimized (e.g. by migrating primaries so that they are close, in terms of network connections, to clients which regularly access them).

Examples of the systems and methods described above provide strong consistency and where this is not possible, many of the systems and methods described above, revert to only providing read access to a data element. When a device wakes or is switched on, it is not necessary for it to check the validity of locally stored data elements before allowing a user access to any of the elements because the MDS maintains consistency even when some devices are unavailable.

Although the methods and systems described above are able to provide strong consistency, in some example implementations, multiple levels of consistency may be enabled within a system. The level of consistency for a particular data element (or collection of data elements) may be configurable for a user. For example, a user may require strong consistency for a first data type (e.g. documents, music files) and may require a lower level of consistency for another data type (e.g. digital photos). In such an example, the methods described above may be implemented for data elements in the first type and for data elements in the second type, the access protocols may be relaxed (e.g. so that a user can edit a cached copy of a data element even when there is no connection to the MDS).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of operating a distributed data storage system, the method comprising:
storing, in a data store, a plurality of data elements, each data element having an associated location attribute identifying a location of the data element and availability attribute identifying availability of the data element, wherein the location attribute is stored in a location which is co-located with the data element and the availability attribute is stored by a metadata service in the distributed storage system;
sending, using a main processor, requests for location information to the metadata service and to send read/write requests to a remote device in the distributed storage system based on location information received from the metadata service, the requests being sent via a communication interface; and
maintaining, using a processing element, network connectivity when a device associated with the main processor is in a reduced power mode and the main processor is off and to wake the main processor on receipt of a read/write request from a remote device in the distributed storage system.

2. A method according to claim 1, further comprising providing read only access to the plurality of data elements when communication with the metadata service is not possible.

3. A method according to claim 1, wherein one of the plurality of data elements comprises one of a set of replicas of a data element, each replica being stored on a different device in the distributed data storage system and the replica stored in the data store being designated a primary replica, the method further comprising sending a message to the metadata service prior to entering the reduced power mode to trigger migration of the primary designation to another of the replicas of the data element.

4. A method according to claim 1, further comprising:
   writing data to a data element in the data store in response to receipt of a write request relating to the data element from a remote device;
   determining if all remote devices storing replicas of the data element are available; and
   sending the write request to a short-term store in the distributed storage system if all the remote devices are not available.

5. A method according to claim 1, further comprising:
   receiving a read/write request relating to a data element in the data store from a remote device
   determining a user location associated with the write request;
   determining if an access control policy associated with the data element is satisfied, the access control policy being defined in terms of at least one of the user location and the location attribute associated with the data element; and
   servicing the read/write request if the access control policy is satisfied.

6. A method according to claim 1, wherein the processing element is mounted within a module, the module further comprising a network interface and wherein the processing element is arranged to maintain network connectivity when the main processor is off via the network interface and to receive read/write requests via the network interface.

7. A method according to claim 1, wherein the data store is further arranged to store a cached copy of metadata received from the metadata service, the metadata comprising the location and availability attributes associated with each data element stored in the distributed data storage system and wherein the main processor is arranged to send a request for updated metadata in response to a failure of a read/write request sent to a remote device based on location information from the cached copy of metadata.

8. A method according to claim 1, wherein the device comprises a consumer device and wherein the distributed data storage system comprises a plurality of different consumer devices.

9. A device for use in a distributed data storage system, the device comprising:
   a data store arranged to store a plurality of data elements, each data element having an associated location attribute identifying a location of the data element and availability attribute identifying availability of the data element, wherein the location attribute is stored in a location which is co-located with the data element and the availability attribute is stored by a metadata service in the distributed storage system;
   a communication interface;
   a main processor arranged to send requests for location information to the metadata service and to send read/write requests to a remote device in the distributed storage system based on location information received from the metadata service, the requests being sent via the communication interface; and
   a processing element arranged to maintain network connectivity when the device is in a reduced power mode and the main processor is off and to wake the main processor on receipt of a read/write request from a remote device in the distributed storage system.

10. A device according to claim 9, wherein the main processor is arranged to provide read only access to the plurality of data elements when communication with the metadata service is not possible.

11. A device according to claim 9, wherein one of the plurality of data elements comprises one of a set of replicas of a data element, each replica being stored on a different device in the distributed data storage system and the replica stored in the data store being designated a primary replica, and wherein the main processor is further arranged to send a message to the metadata service prior to entering the reduced power mode to trigger migration of the primary designation to another of the replicas of the data element.

12. A device according to claim 9, wherein the main processor is further arranged to:
   write data to a data element in the data store in response to receipt of a write request relating to the data element from a remote device;
   determine if all remote devices storing replicas of the data element are available; and
   send the write request to a short-term store in the distributed storage system if all the remote devices are not available.

13. A device according to claim 9, wherein the main processor is further arranged to:
   receive a read/write request relating to a data element in the data store from a remote device
   determine a user location associated with the write request;
   determine if an access control policy associated with the data element is satisfied, the access control policy being defined in terms of at least one of the user location and the location attribute associated with the data element; and
   service the read/write request if the access control policy is satisfied.

14. A device according to claim 9, wherein the processing element is mounted within a module, the module further comprising a network interface and wherein the processing element is arranged to maintain network connectivity when the main processor is off via the network interface and to receive read/write requests via the network interface.

15. A device according to claim 9, wherein the data store is further arranged to store a cached copy of metadata received from the metadata service, the metadata comprising the location and availability attributes associated with each data element stored in the distributed data storage system and wherein the main processor is arranged to send a request for updated metadata in response to a failure of a read/write request sent to a remote device based on location information from the cached copy of metadata.

16. A device according to claim 9, which comprises a consumer device and wherein the distributed data storage system comprises a plurality of different consumer devices.

17. A distributed data storage system comprising a plurality of different devices, each device comprising:
   a data store arranged to store data elements and a location attribute associated with each data element, the location attribute indicating a geographical location of the data element and wherein the location attribute is co-located with the data element; and
   a main processor;
   a processing element arranged to maintain network connectivity when the device is in a reduced power mode and the main processor is off and to wake the main processor on receipt of a read/write request from another device in the system,
   and the system further comprising:

a metadata service arranged to store both a copy of the location attribute and an availability attribute associated with each data element stored in the distributed data storage system, the availability attribute indicating an availability status of the associated data element and to service access requests for data elements received from devices based on the location and availability attributes.

18. A distributed data storage system according to claim 17, further comprising a short-term store and wherein the main processor in a device is further arranged to:
write data to a data element in the data store in response to receipt of a write request relating to the data element from a remote device;
determine if all remote devices storing replicas of the data element are available; and
if all the remote devices are not available, send the write request to the short-term store,
wherein the metadata service and short-term store are hosted in a cloud computing system.

* * * * *